(12) United States Patent
Busatta et al.

(10) Patent No.: US 10,511,683 B2
(45) Date of Patent: Dec. 17, 2019

(54) PROXY FRAMEWORK, SYSTEMS AND METHODS FOR ELECTRONIC DATA INTERCHANGE THROUGH INFORMATION EXCHANGE PLATFORM

(71) Applicant: Open Text GXS ULC, Halifax (CA)

(72) Inventors: Marcelo Busatta, São Paulo (BR); Bhaskar R. Gudlavenkatasiva, Tampa, FL (US); Michael D. McKee, Brentwood, TN (US)

(73) Assignee: OPEN TEXT GXS ULC, Halifax (CA)

( * ) Notice: Subject to any disclaimer, the term of this patent is extended or adjusted under 35 U.S.C. 154(b) by 264 days.

(21) Appl. No.: 15/487,264

(22) Filed: Apr. 13, 2017

(65) Prior Publication Data

US 2017/0302754 A1 Oct. 19, 2017

Related U.S. Application Data

(60) Provisional application No. 62/323,203, filed on Apr. 15, 2016.

(51) Int. Cl.
*H04L 29/08* (2006.01)
*G06F 16/958* (2019.01)
*H04L 29/06* (2006.01)

(52) U.S. Cl.
CPC ........ *H04L 67/2842* (2013.01); *G06F 16/972* (2019.01); *H04L 67/2814* (2013.01); *H04L 67/2819* (2013.01); *H04L 67/303* (2013.01); *H04L 69/08* (2013.01)

(58) Field of Classification Search
CPC ... G06F 16/972; H04L 67/28; H04L 67/2809; H04L 67/2814; H04L 67/2819; H04L 67/2823; H04L 67/2838; H04L 67/2842; H04L 69/08; H04L 67/30; H04L 67/303; H04L 67/306
See application file for complete search history.

(56) References Cited

U.S. PATENT DOCUMENTS

| | | | | |
|---|---|---|---|---|
| 7,599,941 | B2 * | 10/2009 | Bahar | H04L 67/2814 |
| 9,769,248 | B1 * | 9/2017 | Krishnan | H04L 67/28 |
| 2004/0146147 | A1 * | 7/2004 | Picard | H04M 3/53325 |
| | | | | 379/88.22 |
| 2007/0234408 | A1 * | 10/2007 | Burch | G06F 21/31 |
| | | | | 726/6 |
| 2008/0154892 | A1 * | 6/2008 | Liu | H04L 67/2838 |

(Continued)

OTHER PUBLICATIONS

Law et al. "Web-enabling legacy applications," Proceedings 1998 International Conference on Parallel and Distributed Systems, 1998, pp. 218-225 (Year: 1998).*

*Primary Examiner* — Vivek Srivastava
*Assistant Examiner* — William C McBeth
(74) *Attorney, Agent, or Firm* — Sprinkle IP Law Group (57) ABSTRACT

A proxy framework communicatively connected to source systems and backend systems can intercept a call from a client device to a legacy backend system, interprets the call, and determines whether an account associated with the client device has migrated to an information exchange platform. If so, the proxy framework can direct the call to a native backend system that is native to the information exchange platform, instead of the legacy backend system. If not, the call is forwarded to the legacy backend system.

20 Claims, 6 Drawing Sheets

(56) References Cited

U.S. PATENT DOCUMENTS

| | | | |
|---|---|---|---|
| 2010/0131616 A1* | 5/2010 | Walter | H04L 69/08 709/219 |
| 2010/0153493 A1* | 6/2010 | Clarke | H04L 69/08 709/203 |
| 2012/0109885 A1* | 5/2012 | Grube | G06F 16/972 707/609 |
| 2012/0167193 A1* | 6/2012 | Gargaro | H04L 67/02 726/8 |
| 2014/0379495 A1* | 12/2014 | Fielder | G06Q 30/0277 705/14.73 |
| 2015/0229638 A1* | 8/2015 | Loo | H04L 67/02 726/9 |
| 2016/0164863 A1* | 6/2016 | Hitchcock | H04L 67/28 726/10 |
| 2016/0173575 A1* | 6/2016 | Vaswani | H04L 67/2847 709/203 |
| 2017/0033987 A1 | 2/2017 | Bush et al. | |
| 2017/0053352 A1 | 2/2017 | Hill | |
| 2017/0075880 A1* | 3/2017 | Wang | G06F 16/972 |
| 2017/0124515 A1 | 5/2017 | Ceppi et al. | |

* cited by examiner

PROXY FRAMEWORK, SYSTEMS AND METHODS FOR ELECTRONIC DATA INTERCHANGE THROUGH INFORMATION EXCHANGE PLATFORM

CROSS-REFERENCE TO RELATED APPLICATION(S)

This is a conversion of, and claims a benefit of priority from U.S. Provisional Application No. 62/323,203, filed Apr. 15, 2016, entitled "PROXY FRAMEWORK, SYSTEMS AND METHODS FOR ELECTRONIC DATA INTERCHANGE THROUGH INFORMATION EXCHANGE PLATFORM," the entire disclosure of which is fully incorporated by reference herein, including the appendixes.

TECHNICAL FIELD

This disclosure relates generally to data processing in a network computing environment. More particularly, this disclosure relates to a proxy framework and systems and methods implementing the proxy framework for electronic data interchange through an information exchange platform.

BACKGROUND OF THE RELATED ART

Today, enterprises and entities alike recognize the tremendous cost savings by exchanging business documents with their trading partners via an electronic communication method referred to as the Electronic Data Interchange (EDI). However, diverse trading partner capabilities and their disparate and complicated systems present technical, strategy, and/or operational challenges to those considering using EDI.

Migration from one backend system to another can be representative of one such challenge. For some entities, it can be extremely challenging to move millions of rows of data and hundreds of services over a lengthy period of time (often weeks, if not months at a time), while simultaneously keeping their operations running smoothly without interruption and/or having any noticeable effect to their customers.

SUMMARY OF THE DISCLOSURE

An object of the invention is to overcome these challenges and remove obstacles in exchanging information electronically, over disparate networked computer systems. According to embodiments, this object can be achieved in an information exchange platform referred to as a Trading Grid or TG. The OpenText GXS Trading Grid® represents an example of such a Trading Grid or TG.

A Trading Grid operates in a network environment and has the necessary resources (e.g., hardware, software, personnel, etc.) to provide managed services that enable the real-time flow or exchange of information electronically in the network environment in a secure, fast, and reliable manner, between and among disparate entities (also referred to herein as operating units or OUs). Examples of operating units may include enterprises, corporations, companies, agencies, etc. An example of a network environment may include a distributed computer network, a cloud computing environment, or the Internet. Non-limiting examples of managed services may include translation services, format services, copy services, email services, document tracking services, messaging services, document transformation services (for consumption by different computers), regulatory compliance services (e.g., legal hold, patient records, tax records, employment records, etc.), encryption services, data manipulation services (e.g., validation), etc.

A Trading Grid operates to facilitate the real-time flow or exchange of information between disparate entities regardless of standards preferences, spoken languages, or geographic locations. A Trading Grid may be embodied on server machines that support the electronic communication method (e.g., EDI) used by various computers that are independently owned and operated by different entities. In some embodiments, supported data formats may include EDI, Extensible Markup Language (XML), RosettaNet, EDI-INT, flat file/proprietary format, etc. Supported network connectivity may include dial-up, frame relay, AS2, leased line, Internet, etc. Supported delivery methods may include store-and-forward mailbox, event-drive delivery, etc. Supported transport methods may include Hypertext Transfer Protocol (HTTP), File Transfer Protocol (FTP), and Simple Mail Transfer Protocol (SMTP), etc. Supported network security protocols may include Secure Socket Layer (SSL), Secure/Multipurpose Internet Mail Extensions (S/MIME), Internet Protocol Security (IPSEC), Virtual Private Network (VPN), Pretty Good Privacy (PGP) encryption protocol, etc.

Embodiments disclosed herein are directed to a proxy framework operating on an information exchange platform (e.g., a Trading Grid). The proxy framework includes a particularly programmed proxy server communicatively connected to source systems and backend systems of the Trading Grid.

Examples of source systems may include gateway servers that are external to the Trading Grid. Examples of gateway servers may include a FTP gateway server. In general, backend systems refer to enterprise class systems that are used to run a company and support the company's back office. In this disclosure, backend systems may include those utilized by the Trading Grid to provide managed services. As explained herein, these backend systems may include at least a legacy backend system and at least a native backend system.

A legacy backend system may be communicatively connected to the Trading Grid, but may not be programmed to operate on the Trading Grid natively. A native backend system is a backend system that is particularly programmed to operate on the Trading Grid natively.

The proxy server is positioned between such source systems and backend systems and can function as a proxy for a native backend system to receive and process calls intended for a legacy backend system. The term "server" refers to a computer program and/or device providing functionality for other programs and/or devices which are referred to herein as "clients."

The proxy server may intercept client calls (e.g., receive them on behalf of a backend system), interpret the client calls, translate them when necessary, and take appropriate actions at its own initiative(s). For example, the proxy server may receive, via a source system, an application programming interface (API) call from a client device to a legacy backend system of the Trading Grid. Depending upon whether an account associated with the client device has migrated from the legacy backend system to the Trading Grid, the proxy server may take different actions to handle the API call.

In some embodiments, the proxy server may comprise a decision engine and a database. The decision engine may be configured with or otherwise implements a decision logic or decision tree structure. The database may comprise a table containing user account information (e.g., customer identifiers, user identifiers, account identifiers, etc.) and account migration information (e.g., has migrated, has not migrated, etc.). The database may reside in a cache managed by the proxy server and accessible by the decision engine.

The decision logic may operate to dictate that, if an account has migrated, the proxy server is to direct/redirect a corresponding call from that account to a native backend system for processing the call from the client device. The decision logic may further dictate that, if the account has not migrated, the proxy server is to forward the call to the legacy backend system for processing the call from the client device. In some embodiments, the decision logic may be implemented using a rule set and the decision engine may be implemented as a rules engine.

In some embodiments, the proxy server may proxy a response or request from a backend system as well. For example, when a backend system sends a response or request, the proxy server may intercept the response or request from the backend system, interpret the response or request from the backend system, translate the response or request from the backend system when necessary, and forward or direct/redirect the response or request from the backend system as appropriate (e.g., from a native backend system to a legacy backend system then to a source system, from a native backend system to a source system, etc.).

In one embodiment, a system may comprise at least one processor, at least one non-transitory computer-readable storage medium, and stored instructions translatable by the at least one processor to implement a data flow control logic or solution decision logic on a proxy server substantially as described herein. Another embodiment comprises a computer program product having at least one non-transitory computer-readable storage medium storing instructions translatable by at least one processor to perform a method substantially as described herein. Numerous other embodiments are also possible.

Embodiments disclosed herein can provide many advantages. For example, although communicatively connected to various source systems and backend systems, the proxy server can be technology-neutral and independent of the disparate source systems and backend systems and technologies used by such systems. Furthermore, the proxy server may provide context switching based on streamlined property files. The proxy server may run on light weight application server and provide a centralized source of changes. No changes on the client side are necessary and all existing gateway servers can take advantage of the proxy server. This non-intrusive approach also applies to the backend systems as no code changes are required for legacy backend system components and Trading Grid native backend system components.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

DETAILED DESCRIPTION

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Figure 1:
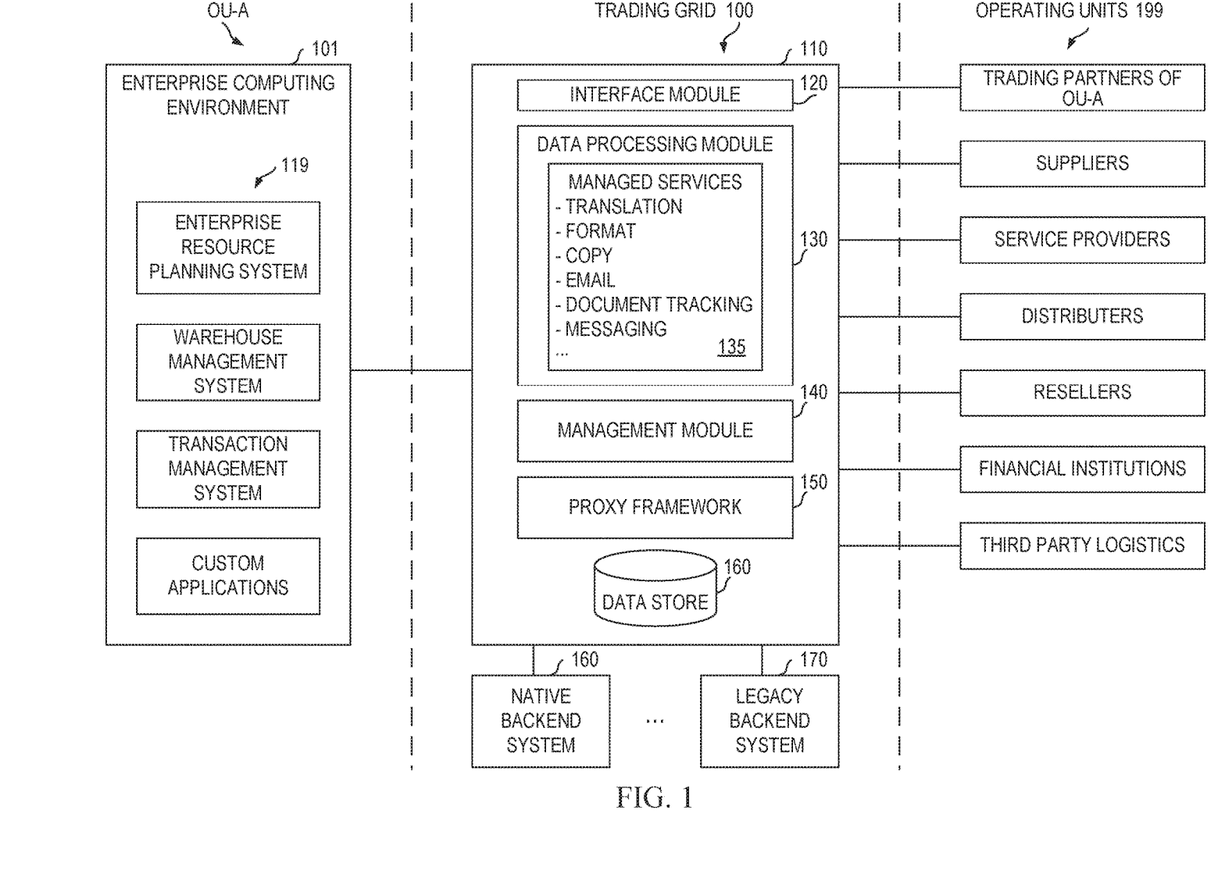
FIG. 1 depicts a diagrammatic representation of an information exchange platform operating in a computer network environment, the information exchange platform having a proxy framework according to some embodiments.

FIG. 1 depicts a diagrammatic representation of an example information exchange platform, referred to as Trading Grid 100, operating in a computer network environment. Non-limiting examples of Trading Grid system architecture, implementations, and features can be found in U.S. Patent Application Publication Nos. US 2017/0124515 A1, US 2017/0053352 A1, and US 2017/0033987 A1, all of which are incorporated by reference herein.

In the example shown in FIG. 1, system 110 operating on Trading Grid 100 may comprise a plurality of modules, including interface module 120, data processing module 130, management module 140, proxy framework 150, and data store 160. In some embodiments, data processing module 130 and management module 140 may be configured to work in concert to provide and manage (orchestrate) a very large number (e.g., 50 or more) of services ("managed services") 135 performed by backend systems 160 . . . 170 operating on Trading Grid 100. Interface module 120 may be configured to provide user interfaces for registered operating units (OUs) such as OU-A with access to services 135.

As an example, OU-A may own and operate enterprise computing environment 101 which is separate and independent of Trading Grid 100. From the perspective of Trading Grid 100 or system 110, OU-A is an enterprise customer and systems 119 of OU-A which utilize services 135 provided by system 110 are client systems of system 110. Client systems 119 operating in enterprise computing environment 101 may use services 135 to communicate (e.g., exchange information) with various systems and/or devices operating in computing environments 199 that are owned and operated by various OUs such as trading partners (TPs) of OU-A.

Non-limiting examples of services 135 may include, but are not limited to, translation services, format services, copy services, email services, document tracking services, messaging services, document transformation services (for consumption by different computers), regulatory compliance services (e.g., legal hold, patient records, tax records, employment records, etc.), encryption services, data manipulation services (e.g., validation), etc. As a specific example, a document may be sent by OU-A from client system 119 (e.g., a custom application) to a computer belonging to a TP of OU-A utilizing Trading Grid 100.

A "document" in this context refers to the encoding of information in digital form for the purpose of exchanging the information with another party. The encoding of the document may also include meta-data about its content, destination, operational parameters, permissions, etc. Examples of documents in this context can include electronic data interchange (EDI)-encoded formats, all of the traditional office formats (Word, Excel, PowerPoint, etc.), computer-aided design and computer-aided manufacturing (CAD/CAM) files, multimedia content including video, and even content that could be provided by a device participating in an Internet of Things network. Skilled artisans appreciate that EDI is an electronic communication method that provides standards for exchanging data via any electronic means and that is defined as the computer-to-computer interchange of formatted messages by agreed message standards. EDI distinguishes mere electronic communication or data exchange in that in EDI, the usual processing of received messages is by computer only. By adhering to the same message standard, TPs, even if they are in two different countries, can electronically exchange documents (e.g., purchase orders, invoices, acknowledgement, notices, etc.).

In some embodiments, system 110 may route the document sent by OU-A from client system 119 to a backend system (e.g., native backend system 160 or legacy backend system 170). Since OU-A is an enterprise customer of Trading Grid 100, system 110 may route the document to native backend system 160, which runs natively on Trading Grid 100, based on a relationship between OU-A and its TP. System 110 may track, via a trading partner graph, all the relationships for all OUs that utilize system 110 to electronically exchange information. The trading partner graph may be maintained and controlled by system 110 independently of an operating unit and/or its trading partner(s). The trading partner graph may be stored in a database (e.g., data store 160) and system 110 may access the trading partner graph by querying the database. Data associated with the operating unit and its trading partner(s) may also be stored in the database. Details and examples of a trading partner graph can be found in the above-referenced U.S. patent application Ser. No. 15/337,884, filed Oct. 28, 2016, entitled "TRADING PARTNER RELATIONSHIP GRAPH FOR INFORMATION EXCHANGE PLATFORM."

Figure 3:
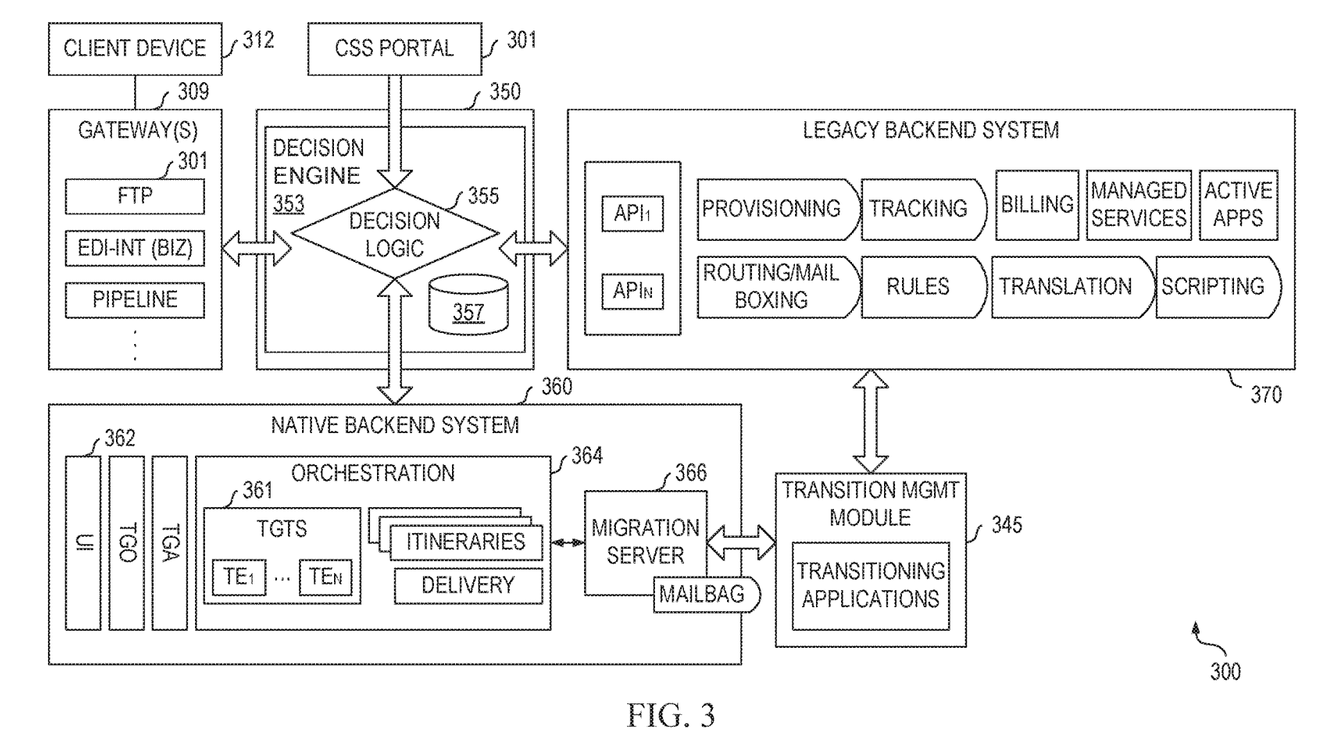
FIG. 3 depicts a diagrammatic representation of an example proxy server comprising a decision engine and a database according to some embodiments.

Native backend system 160 may include a system component such as an orchestration component (e.g., orchestration 364 shown in FIG. 3). The orchestration component may process the document based on instructions associated with the relationship between OU-A and a particular TP of OU-A (referred to as "itineraries"). As an example, an itinerary may indicate that the document is to be processed by decompression, translation, formatting, and validation services. System 110 may deliver the document thus processed to the TP of OU-A.

In some cases, not all OUs may be enterprise customers of system 110. In some cases, not all OUs have the capabilities to communicate with other OUs through Trading Grid 100. Furthermore, some enterprise customers may prefer and/or rely on legacy backend systems (e.g., legacy backend system 170) that are not native to Trading Grid 100, although they may be communicatively connected to Trading Grid 100, as illustrated in FIG. 1.

For OUs that utilize legacy backend systems 170, system 110 may direct calls from client systems associated with those OUs to legacy backend systems 170. Legacy backend systems 170, in turn, may communicate with native backend system(s) 160 of Trading Grid 100 for any necessary processing. Challenges can arise when some accounts associated with legacy backend system(s) 170 have actually migrated to native backend system(s) 160. A goal here is to minimize or eliminate any disruption to the end users of OUs whose accounts have been migrated or are in the process of migrating to native backend system(s) 160.

In embodiments, this goal can be achieved via a new proxy framework particularly built for Trading Grid 100. An example of system architecture for proxy framework 150 is illustrated in FIG. 2.

Figure 2:
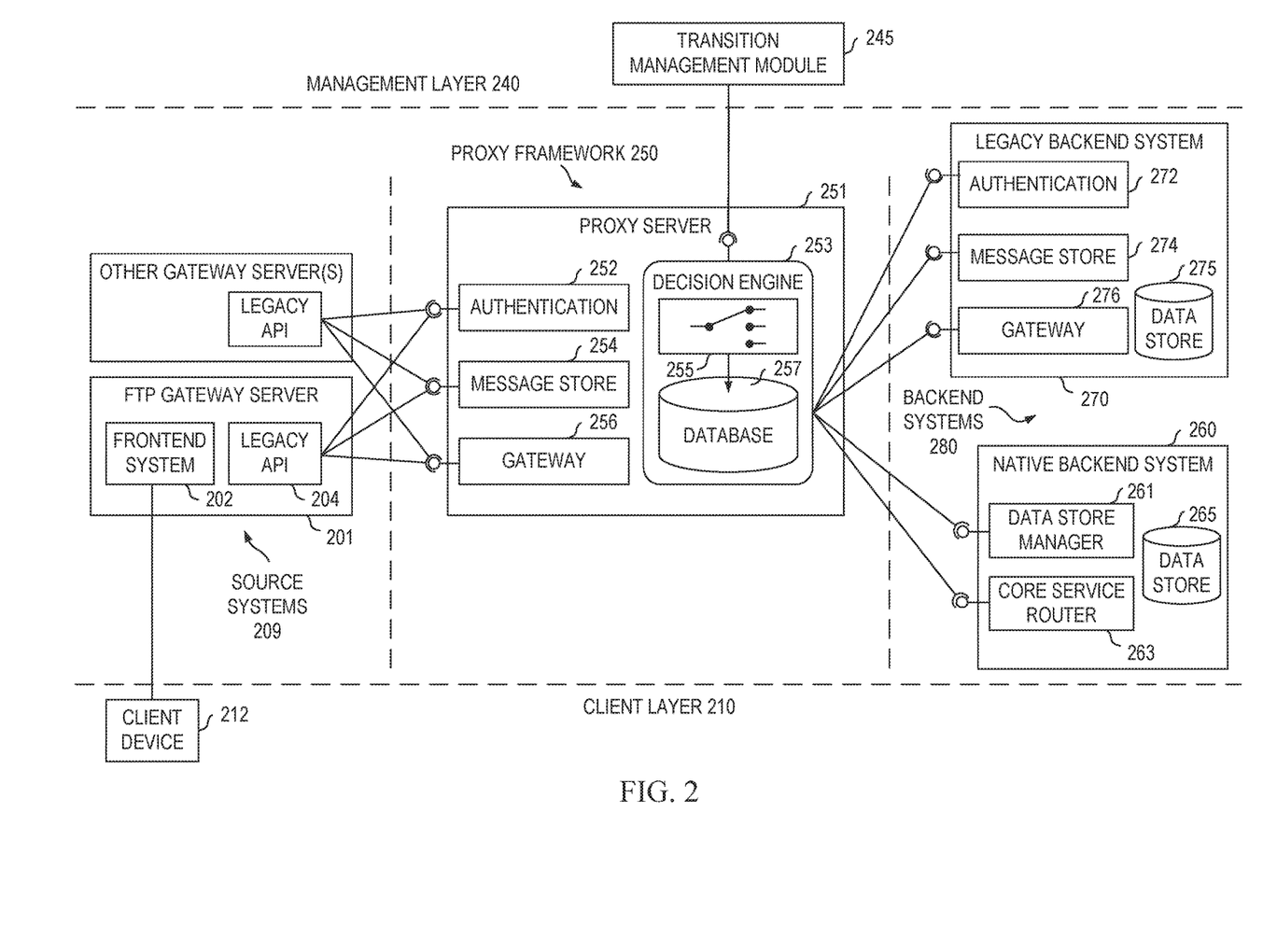
FIG. 2 depicts a diagrammatic representation of an example system architecture for a proxy framework, the proxy framework having a proxy server communicatively connected to various source systems and disparate backend systems of an information exchange platform according to some embodiments.

In the example of FIG. 2, proxy framework 250 (which can be an embodiment of proxy framework 150 shown in FIG. 1) is centrally located and communicatively connected to management layer 240, source systems 209, and backend systems 280. Management layer 240 may comprise transition management module 245. Transition management module 245 may comprise a set of applications, such as migration services, that are utilized to transition enterprise customers of a Trading Grid, within which proxy framework 250 resides. As a non-limiting example, the set of applications for transitioning may be collectively referred to as Move The Intelligence (MTI).

Proxy framework 250 may comprise proxy server 251 particularly configured for communicating with source systems 209 (e.g., gateway server 201) communicatively connected to client devices (e.g., client device 212) residing at a client layer (e.g., client layer 210) of the overall Trading Grid system architecture. Features and components of proxy framework 250 are further described below.

Gateway servers usually operate outside of the trust boundary of a management server or layer (e.g., management layer 240) in a network such as a private computer network or enterprise computing network. Operations of gateway servers are generally more complex than those of a router or switch as they communicate using multiple protocols.

There can be many types of gateway servers (e.g., FTP, HTTP, etc.) for servicing requests from client devices. More specifically, a gateway server may comprise a frontend system for communicating with client devices and APIs for communicating with backend systems (although, explained below, they are actually communicating through proxy framework 250). Embodiments disclosed herein do not require modification to existing gateway servers. As such, existing gateway servers can communicate with proxy framework 250 via legacy APIs. In this example, FTP gateway server 201 comprises frontend system 202 for communicating with client device 212 and legacy API 204 for communicating with legacy backend system(s) 270.

Proxy server 251 may receive API calls (including, but are not limited to legacy API calls) via local/remote interfaces such as Enterprise Java Bean (EJB) interfaces that interface with source systems 209 such as gateway servers or gateways. These calls are received by interceptors of proxy server 251. In the example of FIG. 2, proxy server 251 may include system components such as authentication module 252, message store 254, gateway 256, and decision engine 253. Authentication module 252, message store 254, and gateway 256 may operate as "interceptors" that intercept different types of API calls from source systems 209. These interceptors may be configured with functions that are similar to or that mimic the functions of a legacy backend system so as to minimize disruption to source systems 209 (and hence client devices 212 residing on client layer 210).

For example, similar to authentication module 272 of legacy backend system 270, authentication module 252 may be configured for providing authentication services and operable to authenticate incoming traffic when appropriate. Likewise, similar to message store 274 of legacy backend system 270, message store 254 may be configured for storing messages in various formats. Also, like gateway 276 of legacy backend system 270, gateway 256 may represent a gateway node having networking hardware and devices such as protocol translators, rate converters, and/or signal translators, as well as software/control logic for directing packets to their destinations. Skilled artisans appreciate that the functionality of the system components of proxy server 251 can be implemented in many ways to mimic the functionality of their counter parts at a legacy backend system.

In some embodiments, decision engine 253 may comprise decision logic 255 and database 257. Decision logic 255 may implement a data flow control mechanism or decision tree structure for examining an incoming request or message associated with a user or customer account and taking appropriate action(s) accordingly.

For example, if an account has migrated to native backend system 260, calls (e.g., API calls from gateway servers on behalf of client devices) associated with that account are processed by the appropriate interceptor(s) (e.g., authentication module 252, message store 254, and/or gateway 256) and directed/redirected to native backend system 260 for further processing, for instance, by data store manager 261, core service router 263, etc. Processed data may be persisted in data store 265 maintained by native backend system 260.

If the account has not migrated to native backend system 260 (which is native to the underlying electronic information exchange platform, as discussed above), calls associated with that account are not processed by the interceptors at proxy server 251. Rather, they are forwarded to legacy backend system 270 for processing, for instance, by authentication services 272, message store 274, gateway 276, etc. Processed data may be persisted in data store 275 maintained by legacy backend system 270 (which is communicatively connected to, but is not natively run on the underlying electronic information exchange platform, as discussed above).

In some embodiments, proxy server 251 may handle inter-network/outgoing traffic in a similar manner. For example, when a backend system (e.g., native backend system 260 or legacy backend system 270) sends a response or request, proxy server 251 may intercept the response or request, interpret the intercepted response or request, translate the interpreted response or request when necessary (e.g., translating the API language from a native backend system to one that is supported by a legacy backend system, then to a source system; translating the API language from a native backend system to one that is supported by a source system, then to a client device, etc.), and forward or direct/redirect the translated response or request. In some embodiments, API mapping rules can be stored in a rules database maintained by proxy server 251 may be used for mapping API calls. In such implementations, proxy server 251 may be configured for receiving an API call, determining how that API call should be mapped, and mapping it to an appropriate API according to the API mapping rule(s) so that the call can reach its final destination. Other ways, for example, hard coding, to transform/translate API calls may also be possible.

FIG. 3 depicts a diagrammatic representation of proxy server 350 comprising decision engine 353 operating on Trading Grid 300, exemplifying operations and relationships among Trading Grid components. As illustrated, native backend system 360 (which can be an embodiment of native backend system 260 described above) may comprise user interface (UI) 362, orchestration component 364, and migration server 366.

As new OUs (e.g., those utilizing legacy backend system 370) continue to join Trading Grid 300, their accounts may be migrated from legacy backend system 370 (which is not native to Trading Grid 300) to native backend system 360 (which is native to Trading Grid 300). This transitioning process may be managed and operated via transition management module 345.

More specifically, transition management module 345 (which can implement an embodiment of transition management module 245 described above) may operate to transition user accounts from legacy backend system 370 to native backend system 360. For example, transition management module 345 may comprise transitioning applications such as migration services that can move data associated with an OU from a database (not shown) residing in legacy backend system 370 to a migration database (not shown). Data stored in the migration database (which may be part of transition management module 345) may be accessible by migration server 366 of native backend system 360.

Migration server 366 may work in concert with orchestration component 364 to process the data associated with the OU based on instructions associated with the OU (which are referred to as "itineraries"), for instance, translating the data associated with the OU using one or more translation engines ($TE_1 \ldots TE_N$) of Trading Grid Translation Services 361. Migrated data for transitioned accounts may be accessible via UI 362 of a Trading Grid Application (TGA) such as Trading Grid Online (TGO), as shown in FIG. 3.

Due to the amount of data involved, this transitioning process can take time which, in turn, can cause delay in processing information either from the OU to a trading partner or from a trading partner to the OU. In network transactions where time is of essence, this kind of delay can increase risk exposure and may have serious repercussions for the OU and/or its trading partners.

Alternatively or additionally, some OUs may prefer not to transition to the native backend system. Continuing support for these OUs to communicate with their trading partners without interruption and/or degradation in services and performance can also be extremely important. While bridging applications running on a management layer of the Trading Grid may allow OUs from different platforms (e.g., a legacy electronic information exchange platforms) to communicate with one another without migration, they operate at the application level and do not have control over network traffic.

In computer networks, a proxy server can function as an intermediary between a server and its clients. A proxy server, therefore, can be configured so that it has access to all network traffic coming in to and going out of the server and, in some cases, act on behalf of the server (as a proxy or stand-in for the server). The server's clients may not be aware or notice any difference between the server and its proxy. By strategically leveraging the network structure and functionality of a proxy server and implementing a unique decision engine on the proxy server, embodiments disclosed herein allow OUs from different platforms to seamlessly communicate with one another more efficiently, regardless of whether an OU has migrated to the Trading Grid.

In the example of FIG. 3, proxy server 350 may operate to intercept all incoming traffic from source systems 309 (e.g., gateway servers such as FTP server 308) communicatively connected to client devices such as client device 312. Proxy server 350 may interpret/examine the incoming traffic utilizing decision engine 353. As discussed above, such an interpretation/examination process may entail determining whether further processing such as translation, mapping, and/or formatting may be necessary so that the incoming traffic (e.g., an API call) can reach its destination and, if so, performing the necessary processing. Proxy server 350 may then direct/redirect the traffic to native backend system 360 or forward to legacy backend system 370 accordingly.

Figure 5:
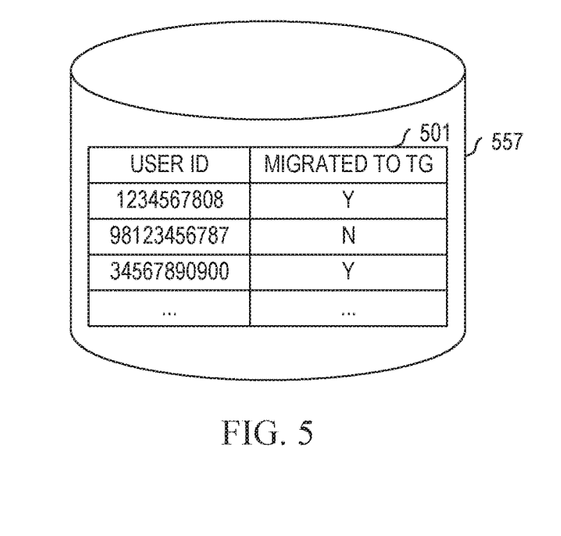
FIG. 5 depicts an example database storing account migration information utilized by a decision engine according to some embodiments.

Decision engine 353 (which can implement an embodiment of decision engine 253 described above) may comprise decision logic 355 implementing a data flow control mechanism based on account migration information stored in database 357. FIG. 5 shows an example of a data structure suitable for storing the account migration information stored in database 357.

In some embodiments, proxy server 350 may provide a web-based interface (e.g., Customer Self Service (CSS) portal 301). An authorized user of an OU may indicate to proxy server 350, via CSS portal 301, how data associated with their account should be handled (e.g., continue using legacy backend system 370 or transition to native backend system 360). This information may be stored in database 357. Skilled artisans appreciate that legacy backend system 370 can be any backend system used by the OU for its operations.

Figure 4:
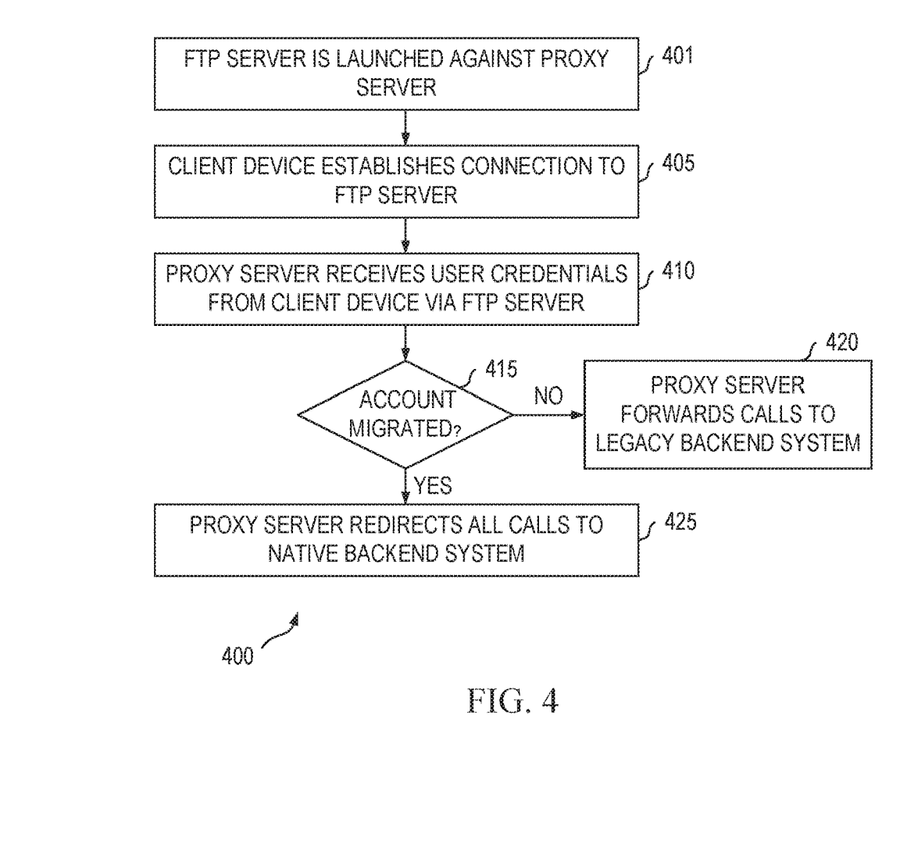
FIG. 4 depicts an example data flow control logic implemented by a proxy server for processing incoming traffic according to some embodiments.

FIG. 4 depicts example data flow control logic 400 which includes decision logic implemented by an embodiment of a decision engine (e.g., decision engine 353 shown in FIG. 3) disclosed herein for processing incoming traffic according to some embodiments.

With reference to FIGS. 3 and 4, suppose a user (e.g., an employee of an OU that utilizes Trading Grid 300 to communicate with its trading partner(s)) at a client device (e.g., client device 312 shown in FIG. 3) may wish to send a document (e.g., via FTP) to a trading partner. Further suppose that the user is associated with an account that normally would cause the document to be processed by a legacy backend system (e.g., legacy system 370) for delivery (e.g., via an email with an attachment of the document).

In this example, the client device may send a client call to open or send a file over the FTP. The client call is first received by a gateway (e.g., source system 309) which, in response, launches an FTP server (e.g., FTP server 308) to handle the FTP call intended for the legacy backend system (e.g., legacy backend system 370) (401). However, as explained above, a proxy server (e.g., proxy server 350) may act as a proxy for the legacy backend system. Accordingly, when launched, the FTP server becomes communicatively connected (e.g., via a legacy API) to the proxy server.

Once the FTP server is launched, the client device may establish a network connection to the FTP server (405). This can be done via an FTP client running on the client device. The FTP client may include a UI or login window through which user credentials (e.g., user identification, password, etc.) may be inputted or otherwise provided by a user associated with the OU, as those skilled in art can appreciate. Such credentials may be necessary to gain access to a service of the Trading Grid and/or to the Trading Grid (and, by association, to the proxy server operating on the Trading Grid). The FTP server receives the user credentials from the FTP client running on the client device and, in turn, sends the user credentials to the proxy server.

The proxy server may support the same FTP functionality with the necessary FTP interface for communicating with the legacy API of the FTP gateway server and establishing an FTP connection. This is so that the client device, from which the client call was made, is not affected (or even aware) whether the call was handled by a legacy backend system or by a native backend system.

The proxy server may receive the user credentials (410) and access a database using the user identification contained in the user credentials provided by the user. The database may store account migration information for all OUs utilizing the Trading Grid. The account migration information associated with the OU may indicate whether an account associated with the user identification has migrated and/or whether incoming traffic associated with the OU should be processed by a legacy backend system or a native backend system.

If an FTP account associated with the client call has already migrated to the native backend system, the FTP credential information (e.g., user account and password) contained in the client call intended for the legacy backend system may no longer be valid and, because the account has migrated to the native backend system, would not have worked even if the legacy backend system is still in operation and the call is routed to the legacy backend system. In this case, an authentication module (e.g., authentication module 252) of the proxy server may operate to access a database (e.g., database 257) or an authentication service, and attempt to authenticate the call for the native backend system. In determining whether the client call can be authenticated, the authentication module may, for example, utilize account migration information that may associate the old FTP credential information contained in the client call with the new one stored in the database or utilize some other authentication mechanism or service.

In some embodiments, a decision engine at the proxy server (e.g., decision engine 353 of proxy server 350 shown in FIG. 3) may operate to determine, based on the account migration information associated with the OU, whether the account associated with the OU has migrated (e.g., to a migration server such as migration server 366 shown in FIG. 3) (415). If the account associated with the OU has not migrated, the proxy server may forward the document (e.g., which may be received from the client device via the FTP connection to the FTP server which is communicatively connected to the proxy server) to the intended legacy backend system (e.g., legacy backend system 370 shown in FIG. 3) for further processing (420). If the account associated with the OU has migrated (and, where applicable, has been authenticated as discussed above), the proxy server may, instead of directing the document to the legacy backend system, direct/redirect the document to a native backend system (e.g., native backend system 360 shown in FIG. 3) for further processing (425).

The backend system (either the legacy backend system or the native backend system), in turn, processes the document accordingly, stores the processed document in their respective data stores (e.g., in a storage or file system location associated with an account for the OU's trading partner), and/or communicates the document to a downstream component, for instance, a FTP client running on a computing device associated with the OU's trading partner.

As illustrated in FIG. 5, database 557 maintained by the proxy server described above may comprise table 501 containing user account information (e.g., customer identifiers, user identifiers, account identifiers, etc.) and account migration information (e.g., has migrated, has not migrated, etc.). In some embodiments, the account migration information stored in table 501 may be updated with migration status information provided by a migration server (e.g., migration server 366 shown in FIG. 3). In some embodiments, the user account information stored in table 501 may be updated to reflect user-provided information (e.g., user input provided via CSS portal 301 shown in FIG. 3). In some embodiments, database 557 may reside in a cache embodied on non-transitory computer memory of the proxy server. The cache may be managed by the proxy server and accessible by the decision engine.

Figure 6:
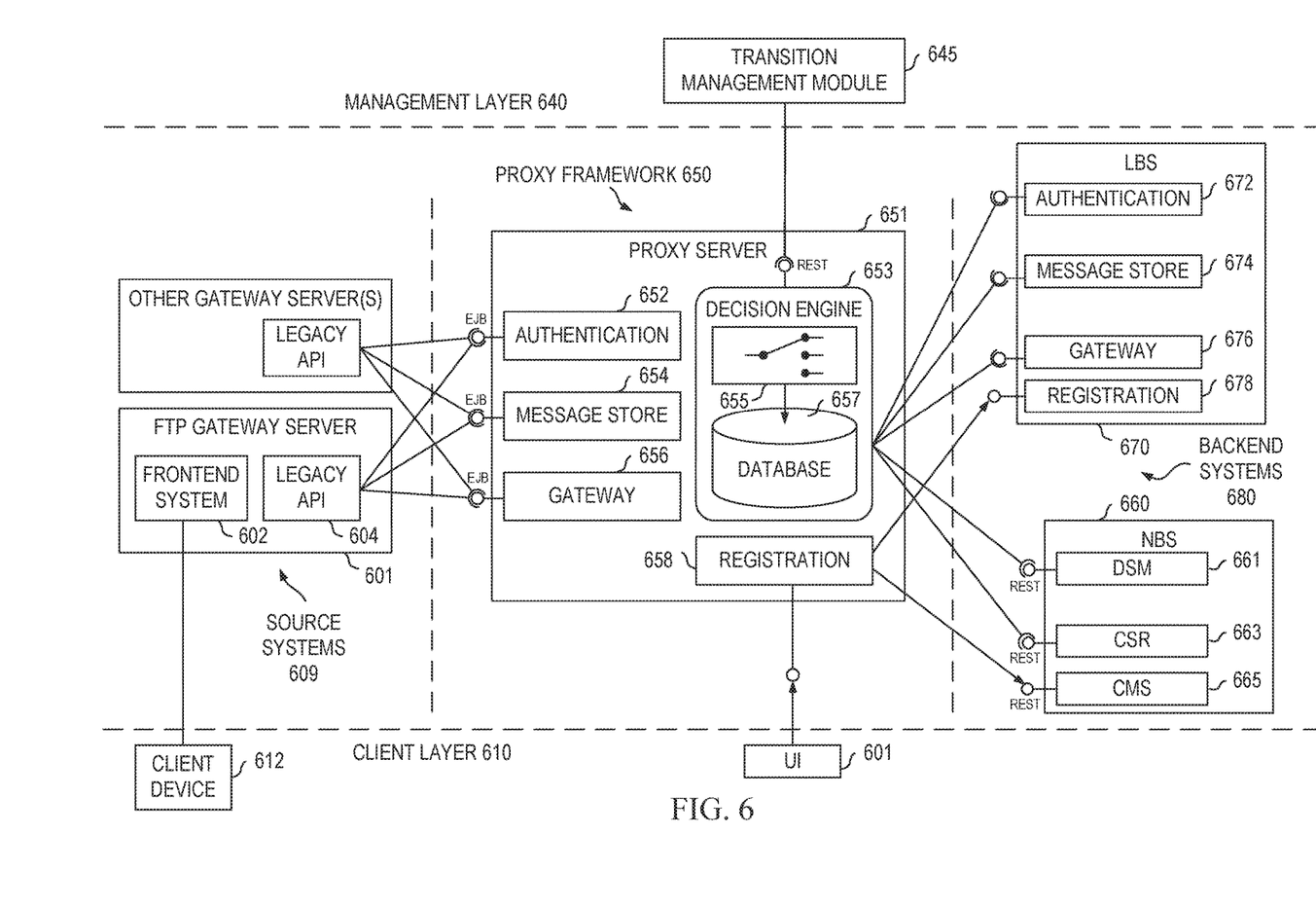
FIG. 6 depicts a diagrammatic representation of another example proxy server according to some embodiments.

The proxy framework and associated components described above may be adapted or otherwise implemented in various forms. FIG. 6 depicts a diagrammatic representation of another example proxy server comprising a decision engine, a database, and a registration component according to some embodiments.

In the example of FIG. 6, proxy framework 650 (which can implement an embodiment of proxy framework 250 shown in FIG. 2) is centrally located and communicatively connected to management layer 640, source systems 609, and backend systems 680. Management layer 640 may comprise transition management module 645 (which can be similar to, or can be an embodiment of) transition management module 245 described above with reference to FIG. 2.

Proxy framework 650 may comprise proxy server 651 which, similar to proxy server 251 described above with reference to FIG. 2, can be particularly configured for communicating with source systems 609, such as FTP gateway server 608, communicatively connected to client devices, such as client device 612, residing at a client layer (e.g., client layer 610) of the overall Trading Grid system architecture. In this example, FTP gateway server 601 comprises frontend system 602 for communicating with client device 612 and legacy API 604 for communicating with proxy server 651.

Proxy server 651 may comprise a plurality of system components including interceptors (e.g., authentication module 652, message store 654, and gateway 656) configured for intercepting different types of API calls from source systems 609, decision engine 653 configured for controlling data flow targeting backend systems (e.g., using decision logic or rule set 655, as described above), and database 657 configured for storing user account information. Decision engine 653 may implement an embodiment of a decision engine described herein (e.g., decision engine 252 described above with reference to FIG. 2). Database 657 may implement an embodiment of a database described herein (e.g., database 557 described above with reference to FIG. 5).

The interceptors of proxy server 651 (e.g., authentication module 652, message store 654, and gateway 656) may operate similar to authentication module 252, message store 254, and gateway 256 described above with reference to FIG. 2. Accordingly, these interceptors may be configured with functions that are similar to or that mimic the functions of authentication module 672, message store 674, and gateway 676 of legacy backend system (LBS) 670.

In this example, proxy server 651 may further comprise an additional interceptor, registration component 658, for performing a registration function that is similar or that mimics the function of registration component 678 of LBS 670. In this case, a request from UI 601 to register a new OU (e.g., perhaps a trading partner of an existing OU) may be intercepted by registration component 658 at proxy server 651. Decision engine 653 may operate to access database 657 and determine whether to forward the registration request to LBS 670, or direct/redirect the registration request to native backend system (NBS) 660 for processing by data store manager (DSM) 661, core service router (CSR) 663, and/or customer management system (CMS) 665. Additional and/or different interceptor(s) can be readily added to/removed from proxy server 651 to reflect the services/functions provided by LBS 670. This example illustrates the extensibility of the proxy framework disclosed herein.

Other implementations may also be possible. For example, in one embodiment, a proxy server disclosed herein may run on a light weight application server. As another example, in one embodiment, the proxy server may support context switching based on simple property files.

In some embodiments, the proxy server operating in the proxy framework disclosed herein may be part of an overall solution to handle the Trading Grid's incoming traffic representing a high volume of client requests (e.g., millions of documents per year). In some embodiments, the overall solution may include a plurality of data flow control solutions, including proxy-based solutions and non-proxy-based solutions. The proxy framework described above represents a proxy-based solution. Non-proxy-based solutions, which may include a Universal Resource Locator (URL) based solution and a load balancer based solution, are not within the scope of this disclosure. In some embodiments, the proxy framework described above may implement proxy-based and non-proxy-based solutions. In some embodiments, a proxy server may be configured to support proxy-based as well as non-proxy-based solutions.

For example, in some embodiments, a proxy server may be configured to aggregate data (e.g., user data from client devices through source systems communicatively connected thereto, transaction data from all traffic flowing through the proxy framework, or a combination thereof). The aggregated data may be stored in a database, data store, or cache accessible by the proxy server. The proxy server may operate to categorize user accounts into different categories, levels, or tiers. Each tier may have an assigned solution for processing traffic (e.g., transaction flows) originating from clients associated with or belonging to that particular tier. In some embodiments, a proxy-based solution such as one described above may be assigned for handling data associated with the first tier of user accounts.

In some embodiments, a solution decision maker (which can be implemented as a feature, component, or function of the proxy server) may be particularly programmed to validate an account, identify a tier associated with the account, and direct the transaction flow associated with the account to the solution assigned to that particular tier. In some embodiments, the proxy server may further include an aggregator configured for analyzing the data collected by the proxy server and generating/updating account-specific statistics (e.g., the total number of messages per day per account, the total size of messages processed per day per account, the total number of messages processed per hour per account, the total size of messages processed per hour per account, etc.). The proxy server (or the decision engine in one embodiment) may utilize these account-specific statistics to execute a rule-based decision to redirect by itself or redirect to an alternate solution.

Figure 7:
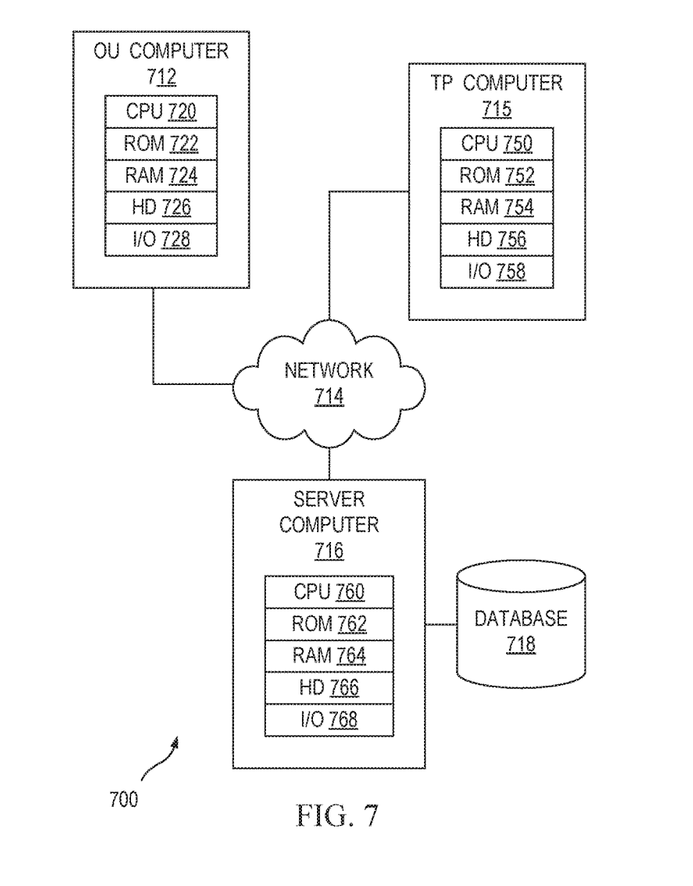
FIG. 7 depicts a diagrammatic representation of a distributed network computing environment where embodiments disclosed can be implemented.

FIG. 7 depicts a diagrammatic representation of a distributed network computing environment where embodiments disclosed can be implemented. In the example illustrated, network computing environment 700 includes network 714 that can be bi-directionally coupled to first enterprise computer 712, second enterprise computer 715, and Trading Grid computer 716. Trading Grid computer 716 can be bi-directionally coupled to data store 718. Network 714 may represent a combination of wired and wireless networks that network computing environment 700 may utilize for various types of network communications known to those skilled in the art.

For the purpose of illustration, a single system is shown for each of first enterprise computer 712, second enterprise computer 715, and Trading Grid computer 716. However, with each of first enterprise computer 712, second enterprise computer 715, and Trading Grid computer 716, a plurality of computers (not shown) may be interconnected to each other over network 714. For example, a plurality of first enterprise computers 712 and a plurality of second enterprise computers 715 may be coupled to network 714. First enterprise computers 712 may include data processing systems for communicating with Trading Grid computer 716. Second enterprise computers 715 may include data processing systems for individuals whose jobs may require them to configure services used by first enterprise computers 712 in network computing environment 700.

First enterprise computer 712 can include central processing unit ("CPU") 720, read-only memory ("ROM") 722, random access memory ("RAM") 724, hard drive ("HD") or storage memory 726, and input/output device(s) ("I/O") 728. I/O 729 can include a keyboard, monitor, printer, electronic pointing device (e.g., mouse, trackball, stylus, etc.), or the like. First enterprise computer 712 can include a desktop computer, a laptop computer, a personal digital assistant, a cellular phone, or nearly any device capable of communicating over a network. Second enterprise computer 715 may be similar to first enterprise computer 712 and can comprise CPU 750, ROM 752, RAM 754, HD 756, and I/O 758.

Likewise, Trading Grid computer 716 may include CPU 760, ROM 762, RAM 764, HD 766, and I/O 768. Trading Grid computer 716 may include one or more backend systems configured for providing a variety of services to first enterprise computers 712 over network 714. These services may utilize data stored in data store 718. Many other alternative configurations are possible and known to skilled artisans.

Each of the computers in FIG. 7 may have more than one CPU, ROM, RAM, HD, I/O, or other hardware components. For the sake of brevity, each computer is illustrated as having one of each of the hardware components, even if more than one is used. Each of computers 712, 715, and 716 is an example of a data processing system. ROM 722, 752, and 762; RAM 724, 754, and 764; HD 726, 756, and 766; and data store 718 can include media that can be read by CPU 720, 750, or 760. Therefore, these types of memories include non-transitory computer-readable storage media. These memories may be internal or external to computers 712, 715, or 716.

Portions of the methods described herein may be implemented in suitable software code that may reside within ROM 722, 752, or 762; RAM 724, 754, or 764; or HD 726, 756, or 766. In addition to those types of memories, the instructions in an embodiment disclosed herein may be contained on a data storage device with a different computer-readable storage medium, such as a hard disk. Alternatively, the instructions may be stored as software code elements on a data storage array, magnetic tape, floppy diskette, optical storage device, or other appropriate data processing system readable medium or storage device.

Those skilled in the relevant art will appreciate that the invention can be implemented or practiced with other computer system configurations, including without limitation multi-processor systems, network devices, mini-computers, mainframe computers, data processors, and the like. The invention can be embodied in a computer or data processor that is specifically programmed, configured, or constructed to perform the functions described in detail herein. The invention can also be employed in distributed computing environments, where tasks or modules are performed by remote processing devices, which are linked through a communications network such as a local area network (LAN), wide area network (WAN), and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer readable medium, hardware circuitry or the like, or any combination and that may be translatable by one or more server machines. Examples of a non-transitory computer readable medium are provided below in this disclosure.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nanoengineered systems, components and mechanisms may be used. The functions of the invention can be achieved by distributed or networked systems. Communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description herein, the meaning of "in" includes "in" and "on" unless the context clearly dictates otherwise.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted. The scope of the present disclosure should be determined by the following claims and their legal equivalents.

What is claimed is:

1. A system, comprising:
a proxy framework comprising a proxy server embodied on non-transitory computer memory, the proxy framework operating on an information exchange platform, the proxy server communicatively connected to, and operating independent of, a plurality of source systems operating in disparate enterprise computing environments, the information exchange platform having backend systems, the backend systems including a legacy backend system and a native backend system, the native backend system native to the information exchange platform, the proxy server comprising:
a decision engine; and
a database storing account migration information;
the proxy server configured for:
intercepting a call from a client device through a source system of the plurality of source systems to the legacy backend system;
interpreting the call from the client device, the call containing an identifier;
accessing the database using the identifier;
retrieving account migration information associated with the identifier;
determining, by the decision engine based on the account migration information, whether an account associated with the client device has migrated to the information exchange platform;
responsive to the account associated with the client device having migrated to the information exchange platform, directing the call to the native backend system native to the information exchange platform; and
responsive to the account associated with the client device having not migrated to the information exchange platform, forwarding the call to the legacy backend system.

2. The system of claim 1, wherein the interpreting comprises translating the call from the client device to a language supported by the native backend system.

3. The system of claim 1, wherein the proxy server further comprises a registration component configured for registration of user accounts on behalf of the legacy backend system, the native backend system, or a combination thereof.

4. The system of claim 1, wherein the proxy server further comprises a cache and wherein the database resides in the cache.

5. The system of claim 1, wherein the proxy server further comprises an aggregator configured for aggregating and storing data in the database, the data including user data from client devices through source systems communicatively connected thereto, transaction data from all traffic flowing through the proxy framework, or a combination thereof.

6. The system of claim 5, wherein the aggregator is further configured for analyzing the data collected at the proxy server, generating account-specific statistics, and storing the account-specific statistics in the database.

7. The system of claim 6, wherein the proxy server is further configured for utilizing the account-specific statistics to execute a rule-based decision for directing or redirecting the call from the client device.

8. The system of claim 1, wherein the proxy server is further configured for categorizing user accounts stored in the database into different categories, levels, or tiers.

9. The system of claim 7, further comprising:
a solution decision maker embodied on non-transitory computer memory, wherein the proxy server is one of a plurality of solutions implemented on the information exchange platform.

10. The system of claim 9, wherein each solution of the plurality of solutions is assigned to a particular category, level, or tier, wherein the solution decision maker is configured for validating an account, identifying a category, level, or tier associated with the account, and directing transaction flow associated with the account to the solution assigned to the particular category, level, or tier.

11. A method, comprising:
intercepting a call from a client device through a source system of a plurality of source systems to a legacy backend system, the intercepting performed by a proxy server embodied on non-transitory computer memory, the proxy server residing in a proxy framework, the proxy framework operating on an information exchange platform, the proxy server communicatively connected to, and operating independent of, the plurality of source systems operating in disparate enterprise computing environments, the information exchange platform having backend systems, the backend systems including the legacy backend system and a native backend system, the native backend system native to the information exchange platform;
interpreting the call from the client device, the call containing an identifier, the interpreting performed by the proxy server;
accessing a database using the identifier, the database storing account migration information, the accessing performed by the proxy server;
retrieving account migration information associated with the identifier, the retrieving performed by the proxy server;
determining whether an account associated with the client device has migrated to the information exchange platform, the determining performed by the proxy server based on the account migration information;
responsive to the account associated with the client device having migrated to the information exchange platform, directing the call to the native backend system native to the information exchange platform, the directing performed by the proxy server; and
responsive to the account associated with the client device having not migrated to the information exchange platform, forwarding the call to the legacy backend system, the forwarding performed by the proxy server.

12. The method according to claim 11, wherein the interpreting comprises translating the call from the client device to a language supported by the native backend system.

13. The method according to claim 11, wherein the proxy server further comprises a registration component configured for registration of user accounts on behalf of the legacy backend system, the native backend system, or a combination thereof.

14. The method according to claim 11, wherein the proxy server further comprises a cache and wherein the database resides in the cache.

15. The method according to claim 11, wherein the proxy server further comprises an aggregator configured for aggregating and storing data in the database, the data including user data from client devices through source systems communicatively connected thereto, transaction data from all traffic flowing through the proxy framework, or a combination thereof.

16. The method according to claim 15, wherein the aggregator is further configured for analyzing the data collected at the proxy server, generating account-specific statistics, and storing the account-specific statistics in the database.

17. The method according to claim 16, wherein the proxy server is further configured for utilizing the account-specific statistics to execute a rule-based decision for directing or redirecting the call from the client device.

18. The method according to claim 11, wherein the proxy server is further configured for categorizing user accounts stored in the database into different categories, levels, or tiers.

19. The method according to claim 17, wherein the proxy server is one of a plurality of solutions implemented on the information exchange platform.

20. The method according to claim 19, wherein each solution of the plurality of solutions is assigned to a particular category, level, or tier, wherein a solution decision maker running on the information exchange platform is configured for validating an account, identifying a category, level, or tier associated with the account, and directing transaction flow associated with the account to the solution assigned to the particular category, level, or tier.

* * * * *